(12) United States Patent
Lauer

(10) Patent No.: US 7,414,997 B2
(45) Date of Patent: Aug. 19, 2008

(54) GPRS TUNNELING PROTOCOL PATH INTEGRITY PROTOCOL

(75) Inventor: Bryan A. Lauer, Hinckley, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 826 days.

(21) Appl. No.: 10/800,214

(22) Filed: Mar. 12, 2004

(65) Prior Publication Data

US 2005/0201371 A1   Sep. 15, 2005

(51) Int. Cl.
*H04Q 7/24* (2006.01)
(52) U.S. Cl. .................. 370/338; 370/248; 370/401
(58) Field of Classification Search .......... 370/241, 370/248, 252, 253, 329, 338, 392, 401
See application file for complete search history.

(56) References Cited

U.S. PATENT DOCUMENTS

| | | | |
|---|---|---|---|
| 6,243,585 B1 | 6/2001 | Pelech et al. | |
| H2051 H * | 11/2002 | Zhu et al. | 370/395.21 |
| 7,023,825 B1 * | 4/2006 | Haumont et al. | 370/338 |
| 7,058,730 B2 * | 6/2006 | Harbin | 709/249 |
| 7,159,035 B2 * | 1/2007 | Garcia-Luna-Aceves et al. | 709/241 |
| 7,180,860 B2 * | 2/2007 | Fonden et al. | 370/235 |
| 7,212,495 B2 * | 5/2007 | Karri et al. | 370/238 |
| 7,215,955 B2 * | 5/2007 | Forssell | 455/433 |
| 7,242,678 B2 * | 7/2007 | O'Neill et al. | 370/349 |
| 7,263,087 B2 * | 8/2007 | Soininen et al. | 370/338 |
| 2002/0021689 A1 | 2/2002 | Robbins et al. | |
| 2002/0061001 A1 | 5/2002 | Garcia-Luna-Aceves et al. | |
| 2002/0122394 A1 | 9/2002 | Whitmore et al. | |
| 2003/0039237 A1 | 2/2003 | Forslow | |
| 2003/0058874 A1 * | 3/2003 | Sahaya et al. | 370/401 |
| 2003/0081607 A1 * | 5/2003 | Kavanagh | 370/392 |
| 2004/0014467 A1 | 1/2004 | O'Neill et al. | |

(Continued)

FOREIGN PATENT DOCUMENTS

WO    WO 02/84956 A1    10/2002

OTHER PUBLICATIONS

3rd Generation Partnership Project; Technical Specification Group Services and System Aspects; General Packet Radio Service (GPRS); Service description; Stage 2 (Release 6); 3GPP TS 23.060 V6.3.0 (Dec. 2003); pp. 1-215, http://www.3gpp.org.; 2003, 3GPP Organizational Partners.

(Continued)

*Primary Examiner*—Ricky Ngo
*Assistant Examiner*—Ben H Liu

(57) ABSTRACT

Network efficiency is improved by building and maintaining path integrity tables in nodes of a network. The tables include path integrity information for paths associated with the nodes. A path is defined by a source address, a destination address and a port or version number. Once a node is made aware of a path, either by handling network message traffic associated with the path or through manual entry, the node maintains path status information with information provided by normal network message traffic, or absent the normal network message traffic, by transmitting Echo Request messages and processing information related to Echo Response messages or the lack thereof. Information related to paths that are disabled for longer than a disabled path duration limit is deleted from the tables. A Gratuitous GTP Echo Response message can notify other nodes of an administrative state change in a node.

32 Claims, 6 Drawing Sheets

U.S. PATENT DOCUMENTS

2004/0028060 A1     2/2004   Kang
2004/0029615 A1 *   2/2004   Gerry et al. ................. 455/560
2004/0162113 A1 *   8/2004   Oomoto et al. ............ 455/560

OTHER PUBLICATIONS

Information Technology-Open Systems Interconnection-Systems Management: State Management Function; CCITT The International Telegraph and Telephone Consultative Committee X.731 (Jan. 1992), International Telecommunication Union; pp. 1-23.

3rd Generation Partnership Project; Technical Specification Group Core Network; General Packet Radio Service (GPRS); GPRS Tunnelling Protocol (GTP) across the Gn and Gp interface (Release 6); 3GPP TS 29.060 V6.3.0 (Dec. 2003); pp. 1-110, http://www.3gpp.org.; 2004, 3GPP Organizational Partners.

* cited by examiner

FIG. 2

| PATH NUMBER | PATH | | | PATH TYPE | ADMINISTRATIVE STATE | OPERATIONAL STATE | TIMESTAMP | PATH DISABLED TIME | REMOTE NODE RESTART COUNTER |
|---|---|---|---|---|---|---|---|---|---|
| | LOCAL NODE IP ADDRESS | REMOTE NODE IP ADDRESS | UDP PORT | | | | | | |
| 1 | 192.168.1.1 | 10.10.10.1 | 2123 | STATIC | UNLOCKED | ENABLED | 14:15:00 | | |
| 2 | 192.168.1.2 | 10.10.10.10 | 2152 | DYNAMIC | UNLOCKED | DISABLED | 14:16:01 | 13:16:02 | |
| ... | | | | | | | | | |

GPRS TUNNELING PROTOCOL PATH INTEGRITY PROTOCOL

BACKGROUND OF THE INVENTION

This disclosure is directed towards systems and methods for accumulating and maintaining information regarding states of nodes in telecommunication networks. The accumulated information can be made available to call processing and other portions of the network. Providing the accumulated information allows for increased efficiency in call processing and other network activities. Embodiments will be described with reference to 3$^{rd}$ Generation Partnership Project (3GPP) Universal Mobile Telecommunications System/General Packet Radio Service (UMTS/GPRS) networks. However, embodiments may be adapted for use in other network environments.

The 3$^{rd}$ Generation Partnership Project is a collaboration agreement between a number of telecommunications standards organizations. The 3GPP develops and promulgates technical specifications and technical reports that guide equipment manufacturers and communications service providers in the development and implementation of communications networks. More information regarding 3GPP can be found at http://www.3gpp.org. The postal address for the 3GPP is 650 Route des Lucioles, Sophia Antipolis, Valbonne, France.

Referring to FIG. 1, an exemplary network portion 110 addressed by standards distributed by the 3GPP includes a mobile device 114, a node B or cell site 118, a Radio Node Controller (RNC) 122, a first Serving GPRS Support Node (SGSN) 124, a first Gateway GPRS Support Node (GGSN) 128, a Charging Gateway Function (CGF) 132, a second SGSN 136 and a second GGSN 142.

For example, the mobile device is a cell phone, laptop computer, personal digital assistant or other device adapted to interface with a mobile communications network. The Node B 118 is a base station or a network radio. The Node B 118 is a major component of a cell site and acts as a link between the mobile device 114 and the rest of the network (122, 124, 128, 136, 142).

The RNC 122 controls and coordinates the operation of the Node B 118 and the plurality of other Node Bs (not shown). For example, the RNC 122 coordinates a handoff between the plurality of other Node Bs and the Node B 118 of the network portion 110 as the mobile device 114 moves out of range of the other Node Bs and into the range of the Node B 118 of the network portion 110. Additionally, the RNC 122 acts as a link between the Node B 118 (and the other Node Bs) and the rest of the network (e.g., 124, 128, 136, 142).

The first SGSN 124 acts as a gateway between the RNC 122 and the rest of the network (e.g., 128, 136). For example, the first SGSN 124 acts as a switching element, directing message traffic to and from the RNC, from and to other points in the network (e.g., 128, 136, 142). The first GGSN 128 acts as a gateway between the exemplary network portion 110 and another network. For example, the first GGSN 128 acts as a gateway between the exemplary network 110 and a public data network 146.

The first SGSN 124 might also direct message traffic to and from the RNC 122 from and to the second SGSN 136. For instance, the second SGSN acts as an interface to other Radio Node Controllers (not shown) and therefore, to other Node Bs. If the called party is associated with another mobile network, the first SGSN 124 might pass message traffic between the RNC 122 and the second GGSN 142 because the second GGSN 142 acts as a gateway or interface between the exemplary network 110 and other public land mobile networks 150.

The Charging Gateway Function 132 is an accounting device. The CGF 132 receives charging data records (CDRs) for the purpose of billing or debiting accounts of subscribers (e.g., the user of the mobile device 114).

As is outlined, for example, in 3GPP Technical Specification Publication TS 29.060, control functions in networks such as the exemplary network 110 are achieved through the exchange of GTP-C or control plane messages between for example, SGSN (e.g., 124, 136) and GGSN (e.g., 128, 142). However, at the Iu-ps interface between RNCs and SGSNs, the control plane is based on Asynchronous Transfer Mode (ATM) technology that is used to transport the Radio Access Network Application Part (RANAP) messages via broadband SS7 standards, while GTP-U provides the user plane. This means that an entire PDP (Packet Data Protocol) context can be established even when a user path associated with the PDP context is disabled. Similar issues can arise between SGSN and GGSN nodes because GTP-C and GTP-U paths can be different. For example, GPT port numbers may be different. In effect, the current standards call for setting up PDP context under the assumption that a selected path is currently available. When the assumption proves to be incorrect, system overhead is adversely effected. Messages are resent until a number of retries have failed. Additionally, load sharing algorithms attempt to channel message traffic to unloaded paths unaware that the reason the paths are unloaded is because they are disabled or administratively locked. Therefore, network resources can be wasted performing repeated retries and calls can be delayed and/or dropped.

For at least the foregoing reasons, there is a desire for systems and methods that increase network status awareness for the nodes that select paths or routes when setting up calls or paths for network message traffic.

SUMMARY OF THE INVENTION

A method for providing improved GTP path integrity assurance in a UMTS/GPRS network includes receiving GTP messages, building a path integrity table of records from information included in the GTP messages and making information in the path integrity table available to call processing and OAM subsystems of the GPRS network. For example, each record in the path integrity table includes a path definition, an operational state entry and a time stamp entry. The path definition includes at least a source IP address, a destination IP address and a port number. The operational state entry can have a value selected from -Enabled-, -Disabled- and -Unknown-. The time stamp entry has a value indicative of a time information in the record was last updated. The method can also include updating records in the path integrity table when additional GTP messages associated with path definitions having records in the table are received. The records are updated based on information included in the additional messages. When expected messages are not received, the records are updated based on the lack of reception of the expected messages.

Receiving GTP messages can include receiving GTP-U and/or GTP-C messages. For example, Receiving GTP Messages can include receiving Create PDP Context Request messages, GTP Echo Request messages, GTP Echo Response messages, Create PDP Context Response messages and GTP User datagrams. Additionally receiving GTP messages can include receiving a new kind of message referred to herein as a Gratuitous GTP Echo Response message which can be transmitted by a node when resources of the node undergo an administrative state change.

The method can include receiving administrative state information regarding the path and storing the administrative state information in an administrative state entry in the path integrity protocol table in association with the path definition. As mentioned above, in some embodiments, when this occurs the method includes transmitting a Gratuitous GTP Echo Response message indicating the value of the administrative state entry to inform another node of the new administrative state. For example, administrative state information can be inferred by a receiving node from a comparison of the Restart Counter within the Recovery Information Element within the Gratuitous GTP Echo Response message and a Restart Counter value stored in a table in the local or receiving node.

Updating records in the path integrity table can include comparing values of the time stamp entries of records in the table to a current time to determine ages of the records, transmitting a GTP Echo Request to the destination IP address and port number associated with any record having an age greater than a desired record age limit, the GTP Echo Request including the source IP address associated with the record and updating the entries of the any record based on a received GTP Echo Response associated with the GTP Echo Request or on a lack there of.

For example updating the entries of the a record can include receiving the GTP Echo Response message and updating the operational state entry to -Enabled- and the time stamp entry to a time associated with the GTP Echo Response message. If it is determined that the GTP Echo Response message was not received, the method can include comparing a retry counter value to a retry limit, transmitting another GTP Echo Request message if the retry counter value is less that the retry limit, incrementing the retry counter; and updating the operational state entry to -Unknown-. If it is determined that the GTP Echo Response message was not received, the method can include comparing a retry counter value to a retry limit, updating the operational state entry to -Disabled- if the retry counter value is equal to or greater than the retry limit and updating the time stamp entry to a time associated with the updating of the operational state entry to -Disabled-.

In some embodiments, when the operational state entry is set to disabled, the method includes setting a path disabled time stamp entry associated with the path definition in the path integrity table to a time associated with the updating of the operational state entry to -Disabled-. Those embodiments can also include comparing the value of the path disabled time stamp entry to a current time, thereby determining a path disabled duration and deleting the record associated with the path definition from the path integrity table if the path disabled duration is greater than a predefined path disabled time limit.

Building the path integrity table can further include manually entering a record including a manually entered path definition, the manually entered path definition including at least a source IP address, a destination IP address and a port number.

In an exemplary embodiment, a method for providing improved GTP path integrity assurance in a UMTS/GPRS network includes defining a path based on a first node IP address, a second node IP address and a UDP port number receiving, at a first node, a first GTP message from a second node extracting the first node IP address from the first GTP message, extracting the second node IP address from the first GTP message, determining an operational state of the path based on the first received message and storing the operational state of the path in a path integrity table, in association with the path definition and a time stamp related to a time the first GTP message was received.

Defining the path can include defining a static path based on a static first node IP address, a static second node IP address and a static UDP port number and storing the static path definition as a path entry in the path integrity table. Alternatively or additionally, defining the path can include defining a dynamic path based on a dynamic first node IP address, a dynamic second node IP address and a UDP port number. Defining the path can include defining the path based a uniform or standard UDP port number.

The method of can include determining a difference between a value of the time stamp and a current time and transmitting a GTP Echo Request message from the first node to the second node, using the UDP port number and using the first node IP address as a source address and the second node IP address as a destination address, if the difference between the value of the time stamp and the current time is greater than a predetermined refresh time.

For example, where the local node is a Radio Node Controller the method can include transmitting a GTP Echo Request from a Radio Node Controller.

Receiving the first GTP message from the second node can include, for example, receiving a Create PDP Context Request, a GTP Echo Request message, a Create PDP Context Response message, a GTP User datagram, a Gratuitous GTP Echo Response message, as mentioned above, or other GTP messages.

The method can also include receiving, at the first node, a second GTP message from the second node, extracting the first node IP address from the second GTP message, extracting the second node IP address from the second GTP message, extracting the UDP port number from the second GTP message, determining the path definition based on the first node IP address, the second node IP address and the UDP port number; determining an operational state of the path based on the second received message, updating the operational state entry associated with the path definition in the path integrity table and updating the time stamp with a value related to a time the second GTP message was received.

Where it is determined that the second node has not responded to the transmitted GTP Echo Request message the method can include determining an operational state of the path to be -Disabled- based on the determination that the second node has not responded to the transmitted GTP Echo Request message, updating the operational state entry associated with the path definition in the path integrity table to be -Disabled- and updating the time stamp with a value related to the determination that the second node has not responded to the transmitted GTP Echo Request message. Under these circumstances, the method can also include setting a Path Disabled Time Stamp entry to a value related to the determination that the second node has not responded to the transmitted GTP Echo Request message. The method can also include deleting the path definition and associated information from the path integrity table if the path disabled duration is greater than a predefined path disabled duration limit.

If it is determined that a GTP Echo Response was not received, the method can include updating the operational state of the path to be -Unknown- and transmitting a second GTP Echo Request message from the first node to the second node, using the port number and using the first node IP address as a source address and the second node IP address as a destination address.

In some embodiments, the method includes extracting a Restart Counter value from the first GTP message and storing the Restart Counter value, in association with the path definition in the path integrity table.

Some embodiments include storing an administrative state of the path, in association with the path definition in the path integrity table.

In some embodiments, the method includes receiving administrative state information regarding the path and storing the administrative state information in an administrative state entry in the path integrity protocol table in association with the path definition. In some of these embodiments, the method includes transmitting a Gratuitous GTP Echo Response message.

Preferably the information in the path integrity protocol table is used to improve network efficiency. For example, the method can include consulting the path integrity table to determine the operational state of the path before attempting to set up a GTP tunnel on the path and choosing an alternate route for the GTP tunnel if the path integrity table indicates the path is disabled or unknown.

One embodiment of a node operative to carry out the path integrity method is a UMTS/GPRS network node comprising main network node functional blocks, a GTP Echo Request/Response processor that is operative to transmit GTP Echo Requests to other nodes in a UMTS/GPRS network when directed to do so by other components of the UMTS/GPRS network node and receive and process GTP Echo response messages from the other nodes in the UMTS/GPRS network as directed by the other components of the UMTS/GPRS network node and a path integrity protocol module that is operative to build a path integrity protocol table by extracting path integrity information from network message traffic associated with the node and record the extracted information in the path integrity protocol table, update the information recorded in the table by extracting updated path integrity information from additional network message traffic associated with the node and recording the extracted updated information in the table, monitor the age of recorded information stored in the table and update old information in the table by directing the GTP Echo Request/Response processor to transmit GTP Echo Requests over paths associated with the old table information and to provide information to the path integrity protocol module regarding the reception or lack of reception of GTP Echo Response messages associated with the GTP Echo Requests, the path integrity protocol module being further operative to replace the old recorded information with new information based on the information provided to the path integrity protocol module by the GTP Echo Request/Response processor.

The main network node functional blocks can be Radio Node Controller main functional blocks, Serving GPRS Support Node main functional blocks, and/or Gateway GPRS Support Node main functional blocks.

The path integrity protocol module can be operative to build a path integrity protocol table by extracting path integrity information from Create PDP Context Request message traffic, GTP Echo Request message traffic, GTP Echo Response message traffic, Create PDP Context Response message traffic, GTP User datagram message traffic or other GTP message traffic.

The path integrity protocol module can be further operative to build a path integrity protocol table by extracting path definition and path operational status information from the network message traffic associated with the node and record the extracted information in the path integrity protocol table. For example the path definition information can include a source IP address, a destination IP address and a port number extracted from the network message traffic associated with the node.

The path integrity protocol module can be further operative to build a path integrity protocol table by extracting Restart Counter information from the network message traffic and storing the Restart Counter information in association with the extracted path definition information.

In some embodiments the path integrity protocol module is further operative to delete path information from the path integrity table when an operational status of the path associated with the path information has been -Disabled- for longer than a path disabled duration limit.

In some embodiments, the path integrity protocol module is further operative to accept manual path definition entries and include records associated with the manual path definition entries in the path integrity protocol table.

In some embodiments the path integrity protocol module is further operative accept manually entered administrative state information associated with a path definition record, and update an administrative state entry in the path integrity protocol table associated with the path definition record according to the manually entered administrative state information. In some of those embodiments the path integrity protocol module is further operative to transmit a Gratuitous GTP Echo Response message indicating the value of the administrative state entry.

DESCRIPTION OF THE DRAWINGS

The invention may take form in various components and arrangements of components, and/or in various procedures and arrangements of procedures. The drawings are only for purposes of illustrating preferred embodiments. They are not to scale, and are not to be construed as limiting the invention.

FIG. 2 is a diagram of an exemplary path integrity protocol table.

DETAILED DESCRIPTION OF THE PREFERRED EMBODIMENTS

Figure 1:
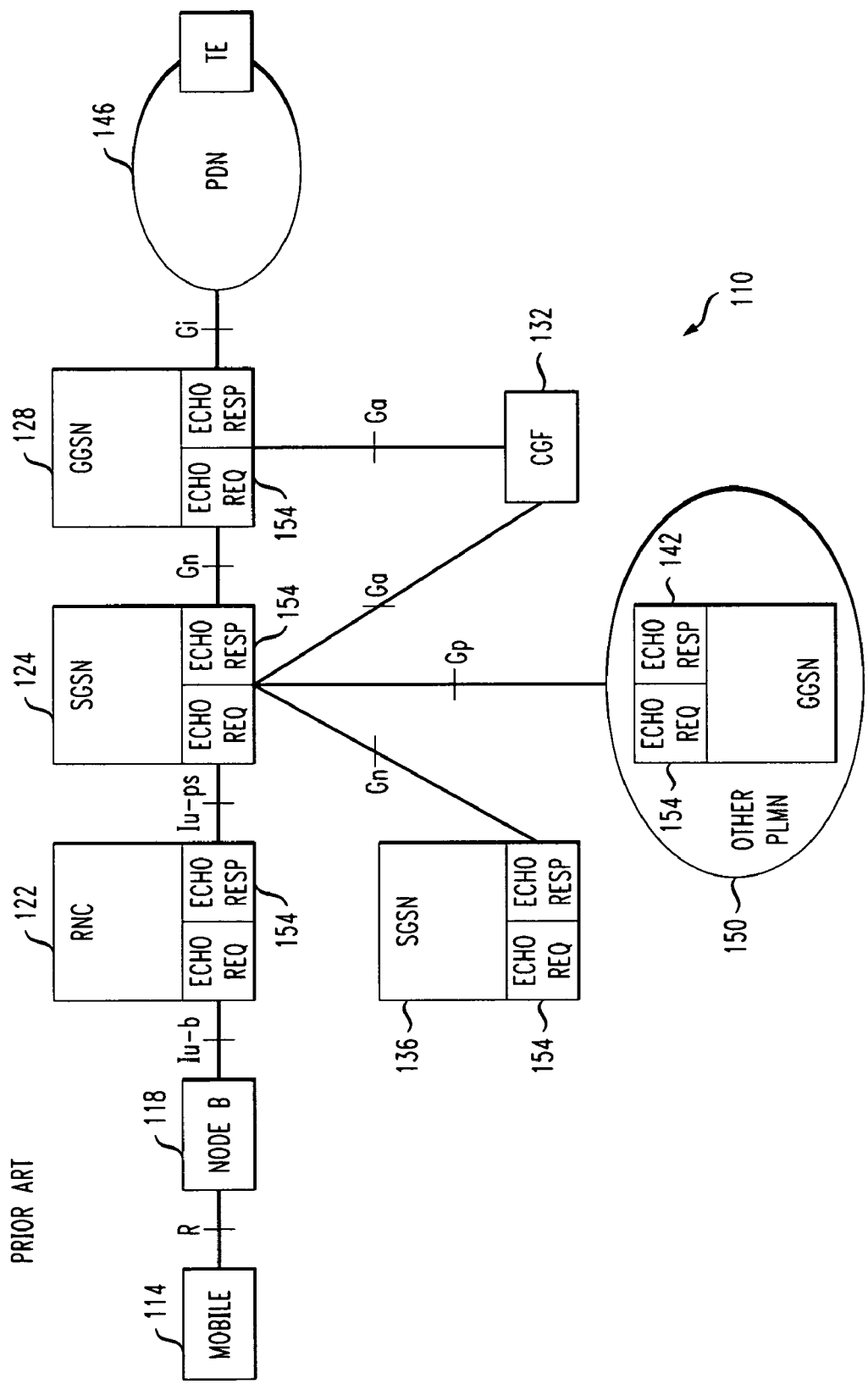
FIG. 1 is a block diagram of a portion of a prior art network.

Currently, some UMTS/GPRS network nodes (those including the functionality of a GTP Echo Request/Response Processor (e.g., 154)) can determine the status of a path along which a PDP context is already established by transmitting GTP Echo Request messages and receiving and processing GTP Echo Response messages. However, the nodes are unaware of and cannot transmit GTP Echo Requests over paths that are not currently associated with active PDP contexts. Furthermore, some nodes, such as, Radio Node Controllers (RNC) (e.g., 122) are historically not equipped to transmit GTP echo requests. Even those nodes that are equipped to request and receive path status information are not equipped to store the status information for any length of time. Instead, the nodes transmit new GTP Echo Requests along paths associated with established PDP contexts whenever the purposes of the nodes require it. Therefore, the nodes (e.g., 122, 124, 128, 136, 142) are completely unaware of the status of paths along which PDP context are not currently established and only some nodes are able to determine the status of paths along which PDP context are established. As explained above, this can lead to wasted resources, reduced quality of service, and dropped calls, for example, in the case of network or network node failures.

Referring to FIG. 2, call processing and/or Operations, Administrations and Maintenance (OAM) processes can be made more efficient where network nodes have ready access to network status or path integrity information. This information can be collected and stored according to a Path Integrity Protocol. The Path Integrity Protocol calls for the establishment of a Path Integrity Protocol Table 210 at each network node having call processing and/or OAM functions (e.g., RNC, SGSN, GGSN). Each entry 214 in the Path Integrity Protocol (PIP) table includes a path definition 218 and other information 222 associated with the path definition 218. Each path definition 218 includes a first or Local Node IP address 226, a second or Remote Node IP address 230 and a UDP port number 234 or GTP version number. The information 222 associated with the path definitions 218 can include, for example, a Path Type 238, an Administrative State 242, an Operational State 246, a Time Stamp 250, a Path Disable Time 254 and a Remote Node Restart Counter 258.

A unique GTP path is a GTP User datagram Protocol/Internet Protocol (UDP/IP) connectionless, unidirectional or bidirectional path between two end points. An IP address and a UDP port number define a GTP endpoint. An associated pair of GTP endpoints defines a GTP path.

The Local Node IP address 226 is an IP address associated with the node building and maintaining the particular PIP Table (e.g., 210) in question. The Remote Node IP address 230 is an IP address associated with another network device with which the local node communicates. For example, if the local node is an SGSN, then the PIP table 210 may include remote node address entries 230 associated with RNCs, GGSNs and other SGSNs.

UDP port numbers are directly associated with GTP versions and both end points of a path use the same version of GTP. Therefore, only one UDP port entry 234 is required to define 218 a path. However, extended or different path definitions are anticipated. If protocols evolve or are developed that use different port numbers at a local node than are used at a remote node then the PIP Table can be extended to include local and remote UDP port numbers or GTP versions.

Path Type 238 entries are optional. Where a Path Type entry 238 is included in the PIP Table (e.g., 212), the Path Type entry 238 can have a value of -Static- or -Dynamic-. A static path is one for which resources are permanently assigned or at least assigned for an extended period of time. Dynamic paths are established over resources that can be automatically reallocated to a different path when network message traffic levels change.

The Administrative State entries 242 are also optional. Where included, Administrative State 242 entries can have values -Locked- or -Unlocked-. Administrative State entries 242 are set manually. For example, when craft personal take a resource offline for maintenance or repair, they make configuration entries or adjustments so informing the node. Those entries or configurations provide the necessary information for populating the Administrative State entries 242 of the PIP Table 210.

In some embodiments, the Administrative State entry 242 is related only to the local node. In other embodiments, the local node may be informed of the Administrative State of the remote node and so the Administrative State entry 242 can be related to the path as a whole. For example, as will be described in greater detail below, a Gratuitous GTP Echo Response message including an updated Restart Counter value can be transmitted by a remote node when craft personnel place the remote node in an administrative -Locked- state. Alternatively, the PIP Table can be expanded to include an Administrative State entry for each of the local node and the remote nodes.

The values of the Operational State entries 246 are determined by the local node. For example, the operational state of a path is determined, derived or inferred from the reception or lack of reception of GTP messages over the path. As will be explained in greater detail below, the values of the Operational State entries 246 can be -Enabled-, -Disabled- and -Unknown-.

More information regarding administrative state and operational state parameters can be found in Recommendation X.731 of the International Telegraph and Telephone Consultative Committee (CCITT) of the International Telecommunication Union (ITU).

Each entry 214 in the PIP Table 210 includes a Time Stamp 250 entry that indicates the freshness of the data 222 associated with the path definition 218. Each time the path integrity data associated with a path entry 214 is updated, the time stamp entry 250 is revised to reflect the current time or if table updating is delayed, a time associated with the path integrity determinations.

The Path Disabled Time entry 254 is a second time stamp. The Path Disabled Time entry 254 is only valid for records 214 or path definitions 218 that are associated with an Operational State entry 246 having a value of -Disabled-. The Path Disabled Time 254 indicates the time when it was first determined that a path 218 was disabled. Additionally, or alternatively, in some embodiments, the Path Disabled Time may be associated with and valid for paths having an Administrative State value of -Locked-. The Path Disabled Time entries 254 are used to prevent the PIP Table 210 from growing too large and from containing too many invalid or dead entries. As will be described in greater detail below, when the Path Disabled Time entry 254 indicates that a path entry 214 associated with a dynamic path has been disabled or locked for an extended period of time, the dynamic path entry 214 is removed or flushed from the PIP Table 210. By definition, static paths are not automatically flushed from the PIP Table 210. Instead, they can be manually removed from the table 210 when the associated resources are reallocated or removed from service.

The Remote Node Restart Counter entries 258 are optional. As will be explained in greater detail below, the Remote Node Restart Counter for a given path can be determined from GTP messages received over the path. If a GTP message indicates that the restart count of a remote node is different than the count value of the Remote Node Restart Counter entry 258 for that path, then the remote node has restarted recently and PDP contexts associated with the path may need to be torn down and/or reestablished.

Figure 3:
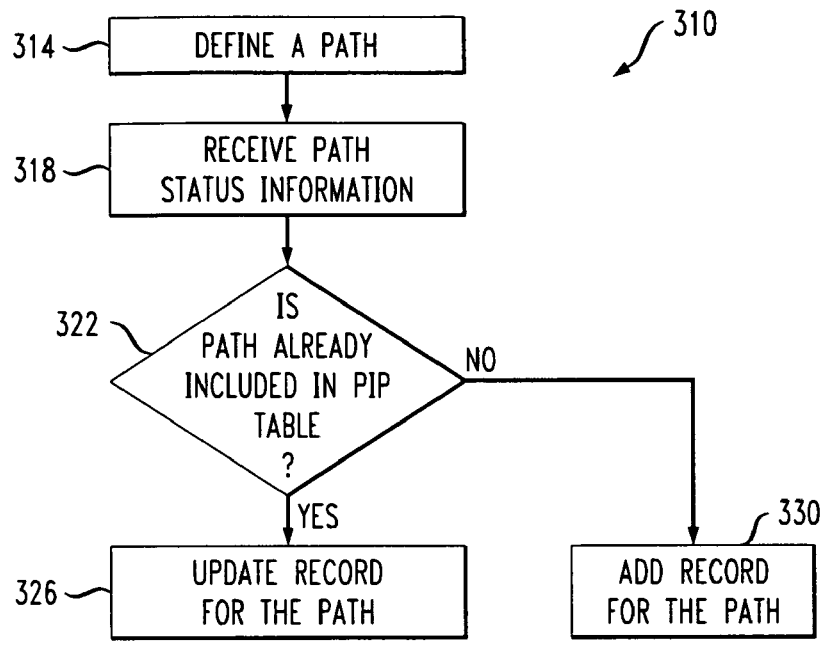
FIG. 3 is a flow chart outlining a method for building and maintaining a path integrity protocol table.
Figure 4:
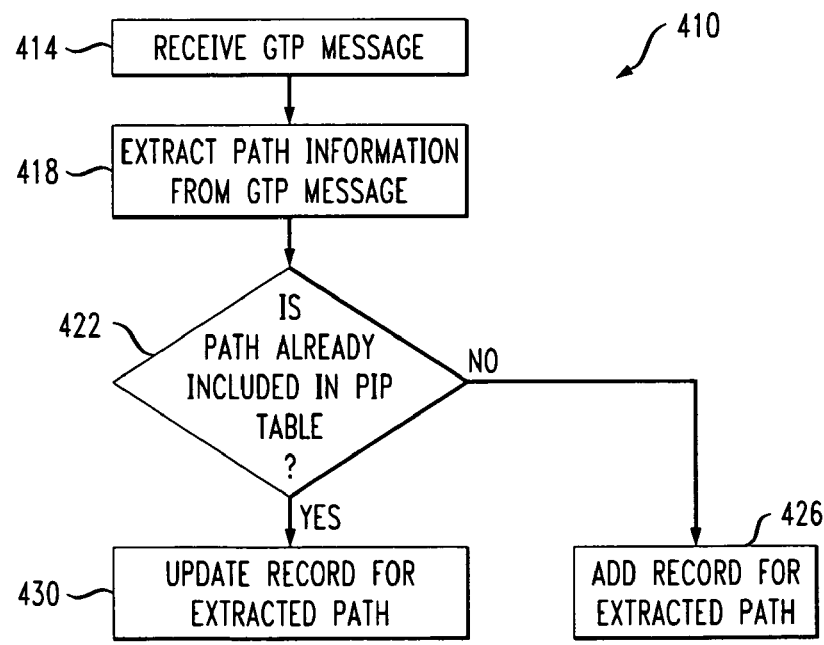
FIG. 4 is a flow chart outlining an embodiment of the method of FIG. 3.
Figure 5:
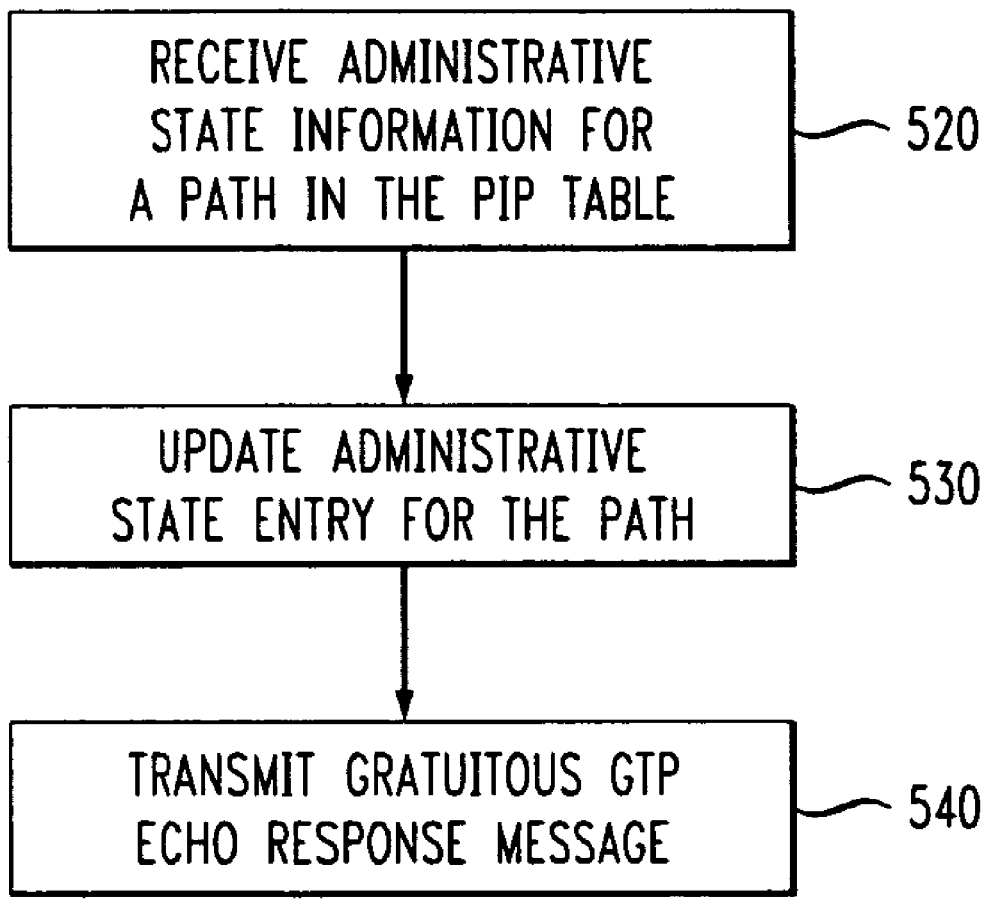
FIG. 5 is flow chart outlining a method for receiving path status information.

Referring to FIG. 3, a method 310 for building and/or maintaining a PIP Table (e.g., 210) includes defining 314 a path, receiving 318 path status information and determining 322 if an entry (e.g., 214) already exists for the defined path. If an entry already exists, then the method 310 includes updating 326 the record or entry (e.g., 214) for the defined path based on the received 318 information. If 322, the path is not already included in the PIP Table, the method 310 includes adding 330 a record or entry (e.g., 214) for the path.

A path may be defined 314 by craft personnel at system commissioning or provisioning. For instance, craft personnel may define a static path in order to accommodate a minimum level of anticipated message traffic between two end points. Additionally, or alternatively, craft personnel may predefine (and preload) dynamic paths. Alternatively, paths are defined dynamically by call processing and/or administrative system components. Therefore, information about path status can be received 318 at a node from manual craft personnel entry. Additionally, path status information can be received 318 as part of a normal network message traffic handling. For instance, GTP messages include path definitions as part of their routing information. At least some GTP messages (e.g., GTP Echo Response, Create PDP Context Request) carry remote device recovery information including, for example, remote device Restart Counter values. The fact that a GTP message is received from a remote device along a defined path indicates that the Administrative State entry 242 of the path associate with the remote device should be set to -Unlocked- and that the Operational State entry 246 of the path should be set to -Enabled-.

While path status or state information is described here as being stored in a table for purposes of ease of explanation, the status information is actually stored in some electronic form. For example, the PIP Table 210 information can be stored in a database. The status or state information 222 is stored in the database in association with the appropriate path definition 218 or path entry 214. Path definitions 218 can be used as, or used to generate, unique keys into the database. Determining 322, if a path is already included in a PIP Table can include using the received 318 path information to generate a key into the database. If a query based on the key returns results, then the path is already included in the PIP Table and the state information 222 can be updated 326 based on the received 318 path status information. If 322 the results of the database query based on the received 318 path definition indicates that a record associated with the path does not exist, then a new record is added 330 including or associated with the received path definition 318 and state information 222.

For instance, in UMTS/GPRS networks, an embodiment of the method 310 for building and maintaining a path integrity protocol table includes a method 410 for building and maintaining a GTP path integrity protocol table. The method includes receiving 414, a GTP message, extracting 418 path information from the GTP message and determining 422 if the extracted path is already included in the path integrity protocol table. If 422 the path integrity protocol table already includes an entry for the extracted path, the status information for that path is updated 430 based on path status information that was extracted 418 from the GTP message. If 422, the path is not already included in the path integrity protocol table, a record is added 426 including an extracted 418 path definition and related path status information. For example, the reception of the GTP message indicates that the path is administratively unlocked and operationally enabled.

Path status information can be extracted 418 from both received 414 GTP-C and GTP-U messages. For example, the reception of any GTP message indicates that the associated path is unlocked and enabled. GTP Echo Response, Create PDP Context and other GTP messages include Remote Node Restart Counter entry 258 information. GTP-C messages from which path information can be extracted 418 include, but are not limited to, Create PDP Context Request, Create PDP Context Response, Update PDP Context Request, Update PDP Context Response, Delete PDP Context Request and Delete PDP Context Response messages. GTP-U messages from which path status information can be extracted 418 include GTP User datagrams. GTP Echo Requests and GTP Echo Response messages can be associated with either the control or user planes.

As explained above, receiving 318 path status information can also include receiving administrative information. For example, a method 510 for updating administrative state information includes receiving 520 administrative state information for a path associated with information in a PIP Table and updating 530 the Administrative State entry for the path. As explained in greater detail below, some embodiments include transmitting 540 a new message referred to herein as a Gratuitous GTP Echo Response message which includes the value of the Administrative State entry (e.g., 242). The Gratuitous GTP Echo Response message is new in the sense that it is transmitted in response to an administrative state change in the transmitting node (from -Unlocked- to -Locked-) and not in response to a GTP Echo Request message. Additionally, the administrative state within the Gratuitous GTP Echo Response message can be inferred by the receiving node from the incrementing of the Restart Counter within the Recovery Information Element within the Gratuitous GTP Echo Response message. Alternatively, a proprietary version of a Gratuitous GTP Echo Response message using a private extension information element can be used to carry an explicit administrative state field.

For instance, during a system provisioning or maintenance processes, craft personnel install, remove, test or repair resources associated with a node. The node is informed, either through manual entry through a user interface or automatically through "plug-and-play" mechanisms whereby the installation or deinstallation of resources is automatically sensed. By one of these mechanisms, or others, the node is informed that paths associated with the resource are to be locked. The node then looks for entries 214 in the PIP Table 210 that are associated with the resource being acted upon by craft. The node then updates 530 the related Administrative State entries 242, setting their values to -Locked- or -Unlocked- as is appropriate for the actions of craft. In some embodiments, when the state change is to -Locked- the node transmits a Gratuitous GTP Echo Response message to nodes associated with the newly locked paths. The Gratuitous GTP Echo messages include updated (incremented) Restart Counter information within the Recovery information element. Receiving nodes can take note of the changed Restart Counter information (by comparing it with Restart Counter 258 information stored in their respective local PIP tables 210) and tear down or clean up associated PDP Contexts and update their respective PIP tables 210 accordingly.

The PIP Table 210 for which updating 530 has been described is for the local node. In some embodiments, the method 510 includes informing remote nodes of the administrative state of the local node so that the remote nodes may update PIP Tables of their own. As mentioned above, in these embodiments, the local node transmits the new message referred to herein as a Gratuitous GTP Echo Response message. The Gratuitous GTP Echo Response message can be identical in form to a GTP Echo Response message. However, a Gratuitous GTP Echo Response message is not transmitted in response to a GTP Echo Request message. Instead, a Gratuitous GTP Echo Response message is transmitted in response to a change in an administrative state of one or more resources of the local node. Where appropriate, a plurality of Gratuitous GTP Echo Response messages are transmitted 540, informing one or more of the remote nodes of the administrative state change to associated paths. For example, administrative state information can be inferred by a receiving node from a comparison of the Restart Counter within the Recovery Information Element within the Gratuitous GTP Echo Response message and a Restart Counter value stored in a PIP table in the local or receiving node. Alternatively, the first Gratuitous GTP Echo Response message can be a proprietary version of a Gratuitous GTP Echo Response message including a private extension field information element for explicitly communicating the administrative state of a transmitting node or path. Of course, in embodiments that include the Gratuitous GTP Echo Response Message Transmission 540, when remote nodes undergo administrative state changes, they too transmit Gratuitous GTP Echo Response messages to the local node. It should be understood that such Gratuitous GTP Echo Response messages are to be included in the GTP messages that can be received 414 and from which path information can be extracted 418 and used to update 430 or add 426 path record information.

Figure 6:
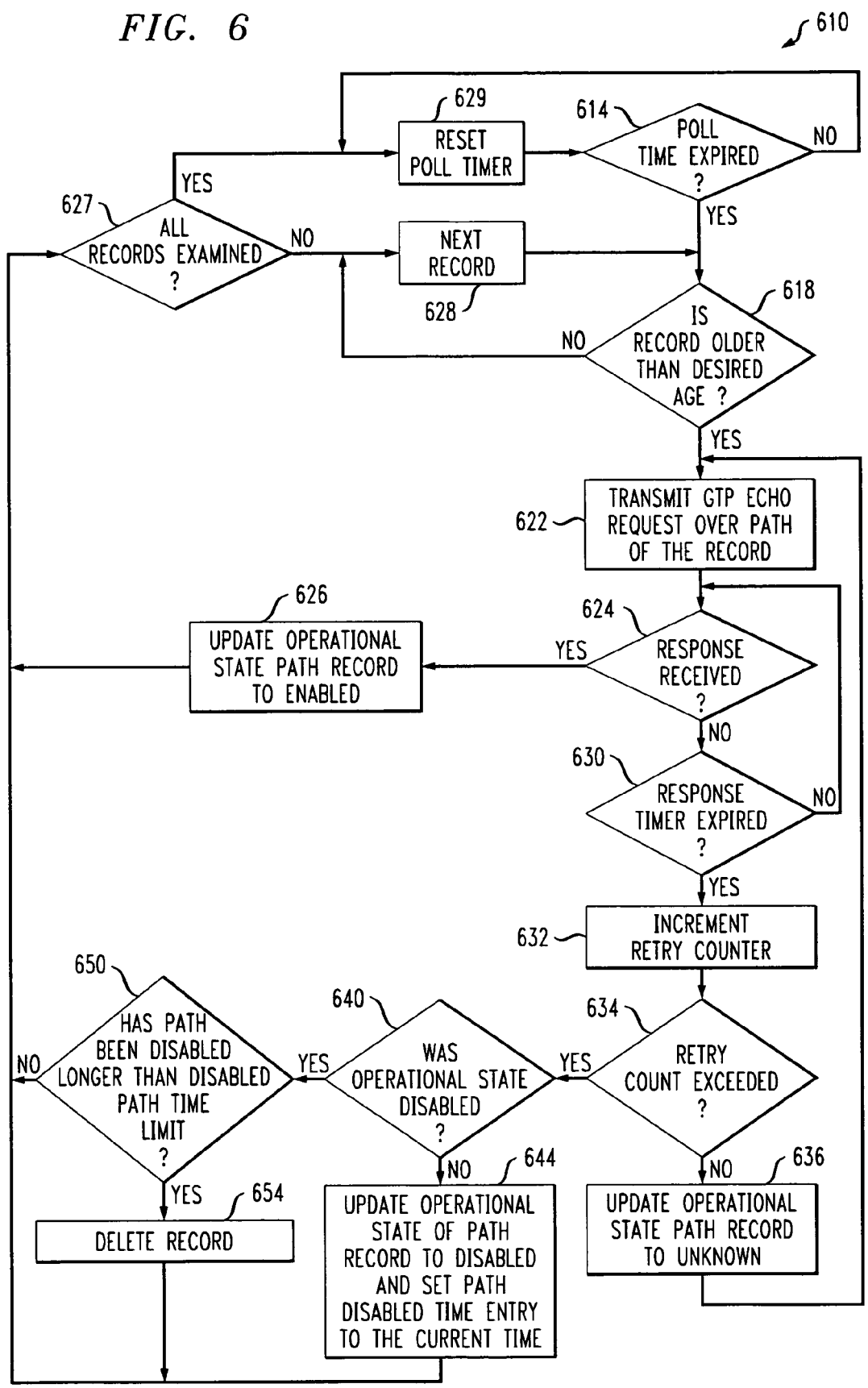
FIG. 6 is a flow chart outlining a method further to the method of FIG. 3 for maintaining a path integrity protocol table.

Referring to FIG. 6, a method 610 for further maintaining a Path Integrity Protocol Table (e.g., 210) includes monitoring the age of status information in the table. When status entries for a path become stale or have an age beyond a desired age threshold or refresh time, updated information is requested. If updating information is not received, the Operational State entry 246 associated with the path (e.g., 214, 218) is updated to have a value of -Disabled-. If the path remains disabled for an extended period of time, or time beyond a disabled time threshold, the path entry 214 and associated state information 222 are removed or flushed from the PIP table.

For example, referring to FIG. 6, a method 610 for further maintaining a Path Integrity Protocol Table (e.g., 210) includes waiting 614 for a poll timer to expire. When the poll timer expires 614, a determination 618 is made as to whether or not a first dynamic path record is older than a desired age, record age threshold or refresh time. For example, the Time Stamp entry 250 for the record is examined or compared with a current time. If the difference between the current time and the value of the Time Stamp entry 250 is greater than a path status information age threshold or refresh time, a GTP Echo Request message is transmitted 622 over the dynamic path associated with the record. If 624 a response is received (i.e., GTP Echo Response), the operational state entry for the path record is updated 626 to a value of -Enabled-, a determination 627 is made as to whether or not all records have been examined and if not, a next record is selected 628 for examination. If 627, all the records (e.g., 214) in the PIP Table have been examined, the poll timer is reset 629.

In this way, once a dynamic path is included in a PIP Table, a node can be aware of and maintain status information for the path, even when the path has no active PDP contexts associated with it. This allows network operations, such as call processing and OAM functions to select paths that are known to be available instead of blindly selecting paths under only an assumption that the paths are available. Once the operational state of the path is updated to 626, the next record is selected 628 for processing.

If no response is received, processing waits 630 until a response timer expires. When the response timer expires, a retry timer is incremented 632. When the retry counter is incremented, a determination 634 is made as to whether a retry count limit is exceeded. If the retry count limit is not exceeded, the operational state of the path record is updated 636 to a value of -Unknown- and a new GTP Echo Request message is transmitted 622.

If 634 the retry count is exceeded, a determination 640 is made as to whether the operational state entry 246 of the record is already set to -Disabled-. If the operational state entry 246 of the record was not already set to -Disabled-, the operational state of the dynamic path record is set 644 to -Disabled- and the Path Disabled Time entry 254 is set equal to the current time or to a time associated with the first determination that the path is disabled. When the operational state 246 and Path Disabled Time entry 254 is properly set, the determination 627 is made as to whether all records have been examined. If all the records have not been examined then the next record is selected 628. If 627 all the records have been examined, the poll timer is reset 629.

If 640 the Operational State entry 246 for the path was already set to -Disabled-, then a determination 650 is made as to whether the path has been disabled for a period longer than a disabled path time limit. For example, the Path Disabled Time entry 254 for the record is compared to the current time. If the difference between the Path Disabled Time entry 254 and the current time is greater than the disabled path time limit, the record is deleted 654 or flushed from the Path Integrity Protocol Table. (e.g., 210). When the record is deleted 654, the determination 627 is made as to whether all records have been examined and processing continues as described above. If 650 the path has not been disabled longer than the disabled path time limit, no deletion takes place and again the determination of 627 is made as to whether all records have been examined and processing continues as described above.

A network node operative to implement the Path Integrity Protocol includes main network node functional blocks for carrying out the main purpose or function of the network node. Additionally, a network node operative to carry out the Path Integrity Protocol includes a GTP Echo Request/Response Processor and a Path Integrity Protocol module or functional equivalents thereof. Each of the main network node functional blocks, the GTP Echo Request/Response Processor and the Path Integrity Protocol Module can be implemented in software, hardware or a combination of software and hardware. The use of the term -processor- is not meant to suggest a hardware implementation. The GTP Echo Request/Response Processor, as well as the other functional blocks, can be implemented as a process, processes or one or more sets of sub-processes distributed over a plurality of hardware or software modules.

A GTP Echo Request/Response Processor (e.g., 154) is operative to transmit GTP Echo Requests in a UMTS/GPRS network when directed to do so by other components of the network node. Additionally, a GTP Echo Request/Response Processor is operative to receive and process GTP Echo Response messages received from the other nodes in the network as directed by the other components or modules of the network node.

The Path Integrity Protocol module is operative to build a Path Integrity Protocol table (e.g., 210) by extracting (e.g., 418) Path Integrity Information from network message traffic associated with the node and recording (e.g., 426) the extracted information in the Path Integrity Protocol table (e.g., 210). The Path Integrity Protocol module is also operative to update (e.g., 430) the information recorded in the table by extracting (e.g., 418) updated Path Integrity Information from additional network message traffic associated with a node and recording (e.g., 430) the extracted updated information in the table (e.g., 210). Furthermore, the Path Integrity Protocol module is operative to monitor (e.g., 618) the age of the recorded information stored in the table and to update old information in the table by directing the GTP Echo Request/Response Processor to transmit (e.g., 622) GTP Echo Requests over paths associated with old table information and to provide information to the Path Integrity Protocol module (e.g., 624, 634, 640) regarding the reception or lack of reception of GTP Echo Response messages associated with the GTP Echo Requests. The Path Integrity Protocol module is then further operative to replace (e.g., 626, 636, 644) the old recorded information with new information based on the information provided to the Path Integrity Protocol module by the GTP Echo Request/Response Processor.

In some embodiments, the Path Integrity Protocol module is further operative to delete (e.g., 654) dynamic path information from the Path Integrity Protocol Table (e.g., 210) when (e.g., 650) for longer than a path disabled time or duration limit.

In some embodiments, the Path Integrity Protocol module is further operative to build and maintain the Path Integrity Table (e.g., 210) by accepting manual path definition entries and including and/or updating records in the Path Integrity Protocol Table based on those manual path information entries. For example, in some embodiments the Path Integrity Protocol module is operative to accept manually entered administrative state information associated with the path definition record (e.g., 214, 218) and update the Administrative State entry (e.g., 242) in the Path Integrity Protocol Table (e.g., 210).

In some embodiments the Path Integrity Protocol module is further operative to transmit a Gratuitous GTP Echo Response message indicating the new value of a restart counter of the node or path. Administrative State entry 242 information associate with the path can be inferred and updated by receiving nodes. The nodes compare the Restart Counter information received in the Gratuitous GTP Echo Response message with Restart Counter 258 previously stored in the PIP table. If the received Restart Counter information is different, the receiving node can infer that the administrative state of the associated path has been changed to -Locked- and can update its local PIP table and take other appropriate actions.

Figure 7:
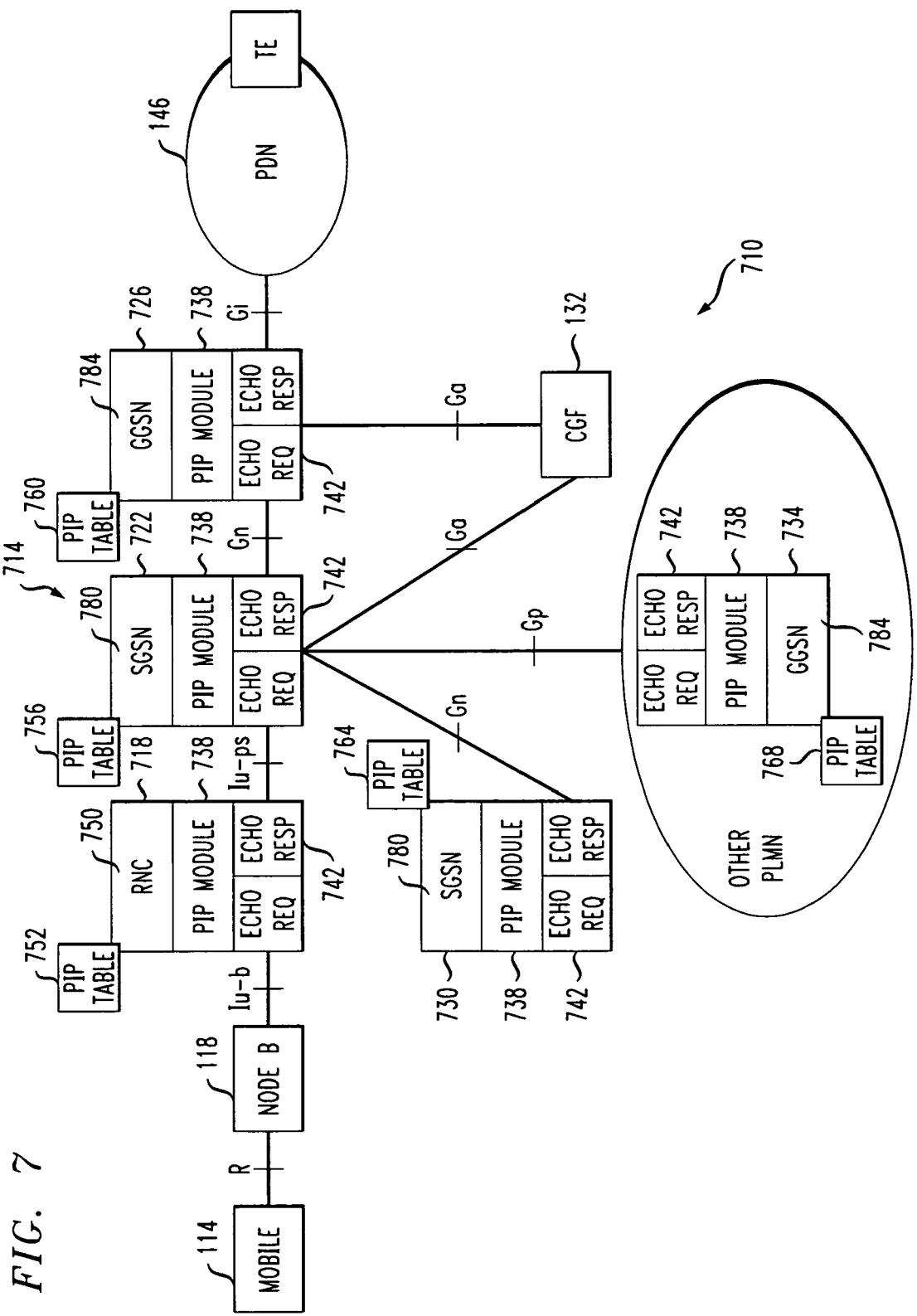
FIG. 7 is a block diagram of a portion of a network operative to build and maintain a path integrity protocol table according to the method of FIG. 3 and FIG. 6.

Referring to FIG. 7, an exemplary portion 710 of network operative to perform the Path Integrity Protocol includes a plurality 714 of network nodes. For instance, the plurality of network nodes are UMTS/GPRS network nodes. For example, the exemplary portion 710 of a network includes an RNC 718, a first SGSN 722, a first GGSN 726, a second SGSN 730, and a second GGSN 734.

Each network node (e.g., 718, 722, 726, 730, 734) includes a Path Integrity Protocol module 738 and a GTP Echo Request/Response Processor 742. Additionally, each network node (e.g., 718, 722, 726, 730, 734) includes main network node functional blocks for carrying out the main function of the node.

For example, the RNC 718 includes Radio Node Controller Functional Blocks 750, at least some of which are adapted to take advantage of the information (e.g., 218, 222) collected by the Path Integrity Protocol module 738 and stored by the Path Integrity Protocol module 738 in a Path Integrity Protocol table 752 of the RNC 718. For instance, call processing and OAM main RNC functional blocks are adapted to take advantage of the RNC PIP Table 752 to improve the efficiency of Call Processing and OAM functions.

As explained above, the Path Integrity Protocol module 738 builds the Path Integrity Protocol table 752 of the RNC 718 by extracting 418 Path Integrity Information from network message traffic received 414 by the RNC 718. The Path Integrity Protocol module 738 uses the extracted information to either build or add 426 to the table 752, when the extracted information is related to a path for which status information is not already recorded in the table 752, or the extracted information is used to update 422 records for paths that have entries (e.g., 214) in the Path Integrity Protocol Table 752 of the RNC 718. Additionally, the Path Integrity Protocol module 738 of the RNC 718 monitors 618 the age of the recorded information stored in the table and updates (e.g., 626, 636, 644) old information in the table by directing the GTP Echo Request/Response Processor 742 of the RNC 718 to transmit (e.g., 622) Echo Request messages over the paths associated with the old information and to provide information to the Path Integrity Protocol module 738 of the RNC 718 regarding the reception or lack of reception 624 of GTP Echo Response messages associated with the GTP Echo Requests. The Path Integrity Protocol module then updates (e.g., 626, 636, 644) the old recorded information with new information based on the information provided by the GTP Echo Request/Response Processor 742 of the RNC 718.

The Path Integrity Protocol module 738 can build and maintain the Path Integrity Protocol Table (e.g., 752) by extracting Path Integrity Information from any of a large number of GTP-U and GTP-C messages. For example, the Path Integrity Protocol module 738 can extract path integrity information from received 414 GTP-U (user plane) datagrams or Packet Data Units (PDU), Create PDP Context Request messages, GTP Echo Request messages, GTP Echo Response messages, Create PDP Context Response messages, Update PDP Context Request Messages, and Update PDP Context Response messages. As explained, in reference to FIG. 2, the extracted information that is stored and updated in the Path Integrity Protocol Table 752 of the RNC 718 includes a path definition including a first or local node IP address 226, a second or Remote Node IP address 230 and a port number 234 as well as status or state information (e.g., 222) associated with that path definition 218. Depending on the point of reference and whether one is referring to a transmitted or received message the Local and Remote Node IP addresses are alternately referred to as source and/or destination addresses.

The status or state information includes an operational state 246 which can be determined or inferred from the reception of messages over the path or from the lack of response to the transmission (e.g., 622) of a GTP Echo Request message. The status information also includes a Time Stamp (e.g., 250) indicating the freshness of the state information 222.

Optionally, the Path Integrity Protocol module infers or extracts 418 administrative state information (e.g., 242) from received 414 messages. For instance, the Path Integrity Protocol modules 738 of the plurality 714 of modules receive 520 administrative state information and update 530 their respective Path Integrity Protocol Tables (e.g., 752, 756, 760, 764, 768). When this occurs, the respective remote nodes (e.g., 722, 726, 730, 734) transmit 540 Gratuitous GTP Echo Response messages including updated Restart Counter information which, as explained above, can be used to update information in PIP tables. The local node (in this example the RNC 718) receives 414 the Gratuitous GTP Echo Response messages and the Path Integrity Protocol module 738 of the local node (or RNC 718) infers or extracts 418 the path and administrative state information and stores the administrative state information in the Path Integrity Protocol Table 752 in association with the appropriate path (e.g., 218, 214). For instance, because the remote node is known to be administratively -Locked-, the Path Integrity Protocol module 738 of the local node sets the Operational State values 246 of paths associated with the remote node to a value of -Disabled- in the PIP table of the local node.

In some embodiments, the Administrative State 242 information is related only to the local node and is received 520 from craft personal working with the node and is only used to update 530 configuration information and the Path Integrity Protocol Table 752 of the local node (e.g., RNC 718).

In some embodiments, the Path Integrity Protocol module 738 is operative to receive or determine and store a path type (e.g., 238). For instance, craft personnel may identify static and dynamic paths during a commissioning or provisioning process. Additionally, dynamic paths are identified by the Path Integrity Protocol Module 738 via Path Information Extraction 418 based on the reception 414 of regular network message traffic.

As explained above, some embodiments extract 418 remote node Restart Counter information (e.g., 258) from received 414 network message traffic. In those embodiments, the remote node Restart Counter is added 426 to or updated 430 in the Path Integrity Protocol table (e.g., 752) of the local node (e.g., 718).

In some embodiments, as part of the PIP Table maintenance procedure, the Path Integrity Protocol module 738 deletes entries (e.g., 214) associated with paths that have Operational State entries 246 of -Disabled- for longer than a disabled path duration or time limit. When it is first determined 640 that a path is disabled, the Path Integrity Protocol module 738 records a time associated with that determination as a Path Disabled Time (e.g., 254) in the record (e.g., 214) associated with the path. If 650 the path remains disabled for longer than a disabled path time limit or duration the Path Integrity Protocol module 738 deletes 654. The information (e.g., 214) related to the disabled path from the Path Integrity Protocol table.

The Path Integrity Protocol modules 738 of other network nodes (e.g., 722, 726, 730, 734) provide functions similar to those described in reference to the Path Integrity Protocol module 738 of the RNC 718. Of course, instead of including main RNC network node functional blocks, the SGSNs (e.g., 722, 730) include main SGSN network node functional blocks 780 and the GGSNs (e.g., 726, 734) include main GGSN network node functional blocks 784. At least some of the SGSN 780 and GGSN 784 functional blocks are adapted to take advantage of their associated Path Integrity Protocol Tables 756, 764, 760 and 768 respectively. For example, call processing and OAM functional blocks (not shown) of the SGSNs (e.g., 222, 230) and the GGSNs (e.g., 226, 234) are adapted to select enabled and unlocked paths based on information in the tables (e.g., 756, 764, 760, 768) for use in call processing and OAM functions.

The invention has been described with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

I claim:

1. A method for providing improved GTP path integrity assurance in a UMTS/GPRS network, the method comprising:
    defining a path based on a first node IP address, a second node IP address and a UDP port number;
    receiving, at a first node, a first GTP message from a second node;
    extracting one or more of: the first node IP address, the second node IP address and the UDP Port number, from the first GTP message;
    determining an operational state of the path based on the first received message; and
    storing the operational state of the path in a path integrity protocol table, in association with the path definition and a time stamp related to a time the first GTP message was received.

2. The method of claim 1 wherein defining the path based on the first node IP address, the second node IP address and the UDP port number comprises:
    defining a static path based on a static first node IP address, a static second node IP address and a static UDP port number; and
    storing the static path definition as a path entry in the path integrity protocol table.

3. The method of claim 1 wherein defining the path based on the first node IP address, the second node IP address and the UDP port number comprises:
    defining a dynamic path based on a dynamic first node IP address, a dynamic second node IP address and a UDP port number.

4. The method of claim 1 further comprising:
    determining a difference between a value of the time stamp and a current time; and
    transmitting a GTP Echo Request message from the first node to the second node, using the UDP port number and using the first node IP address as a source address and the second node IP address as a destination address, if the difference between the value of the time stamp and the current time is greater than a predetermined refresh time.

5. The method of claim 4 further comprising:
    determining that the second node has not responded to the transmitted GTP Echo Request message;
    determining an updated operational state of the path to be -Disabled- based on the determination that the second node has not responded to the transmitted GTP Echo Request message;
    updating the operational state entry associated with the path definition in the path integrity protocol table to be -Disabled-; and
    updating the time stamp with a value related to the determination that the second node has not responded to the transmitted GTP Echo Request message.

6. The method of claim 5 further comprising:
    setting a path disabled time stamp entry to a value related to the determination that the second node has not responded to the transmitted GTP Echo Request message.

7. The method of claim 6 further comprising:
    comparing the value of the path disabled time stamp entry to a current time, thereby determining a path disabled duration; and
    deleting the path definition and associated information from the path integrity protocol table if the path disabled duration is greater than a predefined path disabled duration limit.

8. The method of claim 4 further comprising:
    determining that a GTP Echo Response was not received;
    updating the operational state of the path to be -unknown-; and
    transmitting a second GTP Echo Request message from the first node to the second node, using the port number and using the first node IP address as a source address and the second node IP address as a destination address.

9. The method of claim 1 wherein receiving, at the first node, the first GTP message from the second node comprises:
    receiving a message selected from: a Create PDP Context Request message, a GTP Echo Request message, a Create PDP Context Response message a GTP User datagram and a Gratuitous GTP Echo Response message.

10. The method of claim 1 further comprising:
receiving, at the first node, a second GTP message from the second node;
extracting the first node IP address from the second GTP message;
extracting the second node IP address from the second GTP message;
extracting the UDP port number from the second GTP message;
determining the path definition based on the first node IP address, the second node IP address and the UDP port number;
determining an updated operational state of the path based on the second received message;
updating the operational state entry associated with the path definition in the path integrity protocol table according to the determined undated operational state of the path; and
updating the time stamp with a value related to a time the second GTP message was received.

11. The method of claim 1 further comprising:
extracting a Restart Counter value from the first GTP message; and
storing the Restart Counter value, in association with the path definition in the path integrity protocol table.

12. The method of claim 1 further comprising:
storing an administrative state of the path, in association with the path definition in the path integrity protocol table.

13. The method of claim 1 further comprising:
receiving administrative state information regarding the path; and
storing the administrative state information in an administrative state entry in the path integrity protocol table in association with the path definition.

14. The method of claim 1 further comprising:
consulting the path integrity protocol table to determine the operational state of the path before attempting to set up a GTP tunnel on the path; and
choosing an alternate route for the GTP tunnel if the path integrity protocol table indicates the path state is disabled or unknown.

15. A method for providing improved GTP path integrity assurance in a UMTS/GPRS network, the method comprising:
receiving GTP messages;
building a path integrity protocol table of records from information included in the GTP messages, each record in the path integrity protocol table including a path definition, an operational state entry and a time stamp entry, the path definition including at least a source IP address, a destination IP address and a port number, the operational state entry having a value selected from -Enabled-, -Disabled- -Unknown-, the time stamp entry having a value indicative of a time information in the record was last updated;
updating records in the path integrity protocol table when additional GTP messages associated with path definitions having records in the table are received based on information included in the additional messages, or when expected messages are not received, updating the records based on the lack of reception of the expected messages; and
making information in the path integrity protocol table available to call processing and OAM subsystems of the GPRS network.

16. The method of claim 15 wherein receiving GTP messages comprises receiving messages selected from: Create PDP Context Request messages, GTP Echo Request messages, receiving GTP Echo Response messages, Create PDP Context Response messages, GTP User datagrams and Gratuitous GTP Echo Response messages.

17. The method of claim 15 further comprising:
receiving administrative state information regarding the path;
storing the administrative state information in an administrative state entry in the path integrity protocol table in association with the path definition; and
transmitting a Gratuitous GTP Echo Response message.

18. The method of claim 15 wherein updating records in the path integrity protocol table comprises:
comparing values of the time stamp entries of records in the table to a current time to determine ages of the records;
transmitting a GTP Echo Request to the destination IP address and port number associated with any record having an age greater than a desired record age limit, the GTP Echo Request including the source IP address associated with the record; and
updating the entries of the any record based on a received GTP Echo Response associated with the GTP Echo Request or on a lack thereof.

19. The method of claim 18 wherein updating the entries of the any record comprises:
receiving the GTP Echo Response message; and
updating the operational state entry to -Enabled- the time stamp entry to a time associated with the GTP Echo Response message.

20. The method of claim 18 wherein updating the entries of the any record comprises:
determining that the GTP Echo Response message was not received;
comparing a retry counter value to a retry limit;
transmitting another GTP Echo Request message if the retry counter value is less that the retry limit;
incrementing the retry counter; and
updating the operational state entry to -Unknown-.

21. The method of claim 18 wherein updating the entries of the any record comprises:
determining that the GTP Echo Response message was not received;
comparing a retry counter value to a retry limit;
updating the operational state entry to -Disabled- if the retry counter value is equal to or greater than the retry limit; and
updating the time stamp entry to a time associated with the updating of the operational state entry to -Disabled-.

22. The method of claim 21 further comprising:
setting a path disabled time stamp entry associated with the path definition in the path integrity protocol table to a time associated with the updating of the operational state entry to -Disabled-.

23. The method of claim 22 further comprising:
comparing the value of the path disabled time stamp entry to a current time, thereby determining a path disabled duration; and
deleting the record associated with the path definition from the path integrity protocol table if the path disabled duration is greater than a predefined path disabled time limit.

24. A UMTS/GPRS network node comprising:
main network node functional blocks;
a GTP Echo Request/Response processor that is operative to transmit GTP Echo Requests to other nodes in a UMTS/GPRS network when directed to do so by other components of the UMTS/GPRS network node and receive and process GTP Echo response messages from the other nodes in the UMTS/GPRS network as directed by the other components of the UMTS/GPRS network node;

a path integrity protocol module that is operative to build a path integrity protocol table by extracting path integrity information from network message traffic associated with the node and record the extracted information in the path integrity protocol table, update the information recorded in the table by extracting updated path integrity information from additional network message traffic associated with the node and recording the extracted updated information in the table, monitor the age of recorded information stored in the table and update old information in the table by directing the GTP Echo Request/Response processor to transmit GTP Echo Requests over paths associated with the old table information and to provide information to the path integrity protocol module regarding the reception or lack of reception of GTP Echo Response messages associated with the GTP Echo Requests, the path integrity protocol module being further operative to replace the old recorded information with new information based on the information provided to the path integrity protocol module by the GTP Echo Request/Response processor.

25. The UMTS/GPRS network node of claim 24 wherein the main network node functional blocks comprise functional blocks selected from: Radio Node Controller main functional blocks, Serving GPRS Support Node main functional blocks and Gateway GPRS Support Node main functional blocks.

26. The UMTS/GPRS network node of claim 24 wherein the path integrity protocol module is operative to build a the path integrity protocol table by extracting path integrity information from at least one of Create PDP Context Request message traffic, GTP Echo Request message traffic, GTP Echo Response message traffic, Create PDP Context Response message traffic and GTP User datagram message traffic.

27. The UMTS/GPRS network node of claim 24 wherein the path integrity protocol module is further operative to build a the path integrity protocol table by extracting path definition and path operational status information from the network message traffic associated with the node and record the extracted information in the path integrity protocol table.

28. The UMTS/GPRS network node of claim 27 wherein the path integrity protocol module is further operative to build the path integrity protocol table by extracting path definition information including a source IP address, a destination IP address and a port number from the network message traffic associated with the node and record the extracted information in the path integrity protocol table.

29. The UMTS/GPRS network node of claim 27 wherein the path integrity protocol module is further operative to build the path integrity protocol table by extracting Restart Counter information from the network message traffic and storing the Restart Counter information in association with the extracted path definition information.

30. The UMTS/GPRS network node of claim 24 wherein the path integrity protocol module is further operative to delete path information from the path integrity protocol table when an operational status of the path associated with the path information has been -disabled- for longer than a path disabled duration limit.

31. The UMTS/GPRS network node of claim 24 wherein the path integrity protocol module is further operative to accept manual path definition entries and include records associated with the manual path definition entries in the path integrity protocol table.

32. The UMTS/GPRS network node of claim 24 wherein the path integrity protocol module is further operative accept manually entered administrative state information associated with a path definition record, and update an administrative state entry in the path integrity protocol table associated with the path definition record according to the manually entered administrative state information.

* * * * *